United States Patent [19]

Schroeder

[11] Patent Number: 4,779,406
[45] Date of Patent: Oct. 25, 1988

[54] MOWER WITH TILTING MOWER DECK

[76] Inventor: Walter J. Schroeder, 4077 State Rte. 613, Leipsic, Ohio 45856

[21] Appl. No.: 109,913

[22] Filed: Oct. 19, 1987

[51] Int. Cl.$^4$ .................. A01D 34/64; A01D 34/24
[52] U.S. Cl. .................. 56/15.9; 56/DIG. 22
[58] Field of Search .................. 56/15.8, 15.9, 6, 13.6, 56/16.2, DIG. 22

[56] References Cited

U.S. PATENT DOCUMENTS

| | | | |
|---|---|---|---|
| 3,400,521 | 9/1968 | Caldwell | 56/6 |
| 3,473,302 | 10/1969 | Caldwell | 56/6 |
| 3,624,698 | 11/1971 | Storm | 56/10.7 |
| 4,048,790 | 9/1977 | Zweegers | 56/13.6 |
| 4,395,865 | 8/1983 | Davis, Jr. et al. | 56/DIG. 22 |
| 4,429,515 | 2/1984 | Davis, Jr. et al. | 56/16.2 |
| 4,441,306 | 4/1984 | Kuhn | 56/15.9 |
| 4,563,019 | 1/1986 | Kuhn et al. | 56/DIG. 22 |

*Primary Examiner*—Paul J. Hirsch
*Attorney, Agent, or Firm*—David H. Wilson

[57] ABSTRACT

A mower deck assembly which inverts to enable servicing of the mower blade and underside of the deck from above without removal of the assembly from the power unit. Deck support arms are pivotally connected to the power unit and deck and can be elevated to permit tilting of the deck beyond a perpendicular to the terrain. Terrain engaging deck support outboard of the deck pivot connections develop a gravity moment retaining the tilted position when they are engaged with terrain outboard of the pivot connections. Drive coupling is maintained by a continuous loop link between drive shafts coaxial with the pivot connections at the drive unit and at the deck.

26 Claims, 4 Drawing Sheets

MOWER WITH TILTING MOWER DECK

BACKGROUND OF THE INVENTION

This invention relates to lawn mowers and more particularly to mowers with mower decks outboard of their drive units which can be tilted upward.

Heretofore it has been known to mount mower deck assemblies on drive units, prime movers or tractors having power takeoffs which provide rotational drives for the blade or blades within the deck. Such combinations have included means for raising the mower deck while it is carried by the drive unit, tractor or prime mover. Typically, decks outboard of the drive unit have been pivoted to the drive unit.

Hicks U.S. Pat. No. 4,307,561 of Dec. 29, 1981 for "Blade Housing Lift for Riding Mower" discloses a deck assembly pivotally mounted ahead of a vehicle chassis at the rear of the assembly with a hydraulic cylinder for lifting the assembly for non-mowing transport. The cylinder has a piston rod with a pulley at its end engaging the bight of a loop of flexible chain, one end of which is secured to the chassis and the other end of which is secured to the deck assembly, so that extension of the rod raises the bight of the chain and deck. The arrangement permits raising the deck assembly about its chassis pivot support to an inclination of about thirty degrees to the ground.

Kuhn U.S. Pat. No. 4,441,306 of Apr. 10, 1984 for "Implement Working Height - Adjustment Mechanism" shows a mower of the type disclosed by Hicks with a direct link of a lift cylinder piston arm pivotally connected to a support arm for the mower deck assembly. Kuhn's arrangement also limits the lifted position of the deck assembly relative to the ground. A later U.S. Pat. No. 4,563,019, of Kuhn et al. has a similar structure with limited upward pivotal motion of the deck assembly to less than a thirty degree inclination to the ground.

Witt et al. U.S. Pat. No. 4,325,211, of Apr. 20, 1982 for "Floating Deck for Rider Mower" shows a cutting unit suspended from a traction unit by a forwardly extending frame which has limited upward pivotal movement on the traction unit for transport purposes.

It is also known in the construction of ditch bank mowers to pivot mower deck assemblies at the side of the traction unit along the adjacent deck side and to adjustably lift the deck assembly wings by hydraulic cylinders.

Davis et al. U.S. Pat. Nos. 4,395,865 and 4,429,515 of Aug. 2, 1983 and Feb. 7, 1984 respectively disclose self-propelled lawn mowers having a multiplicity of rotary cutting blades below a main deck assembly and wings on the main deck sides containing blades. The wings are hinged to the main deck at their sides adjacent the main deck and parallel to the longitudinal or normal travel advance axis of the traction unit and the main deck is arranged for limited upward pivotal movement relative to the traction unit for transport as described above.

The aforenoted typical prior art each provided a mower deck assembly having limited upward motion around a pivot in the case of mower decks pivoted along axes normal to the line of travel of the drive unit, particularly where such decks are mounted ahead of the drive unit. Maintenance of mower deck assemblies, their driving mechanisms and their blades has required inverting the drive unit and the mower deck assembly unit, or working on the unit while in a prone or nearly prone position even with the deck assembly raised to its inclined position, or disassembly of the mower assembly unit from the drive unit. This inconvenience in servicing results in a tendency to neglect maintenance, a substantial effort in performing maintenance, and lost time in such performance.

In accordance with this invention, the underside of the mower deck assembly is made readily and conveniently accessible by arranging the deck assembly so that it can be inverted to reveal its underside and mower blades without disassembly of the machine.

Deck assemblies are mounted on a drive unit outboard of the drive unit on a linkage pivotally connected to the drive unit and to the deck so that the deck can be raised from the terrain being mowed. The pivotal connections have parallel pivot axes and can be at the ends of a pair of arms forming the support linkage so that the deck is elevated by rotating the arms around their pivot axis to the drive unit. Arm length and the relationship of the deck to the drive unit structure permit the deck to be raised to an extent enabling it to be pivoted around the pivot axis of the pivotal connections between the arms and the deck from a generally horizontal position to or beyond a generally vertical position whereby the underside of the deck and the rotary mower blade or blades mounted thereon are exposed for servicing from above and outboard of the deck assembly-drive unit combination.

The rotated or upwardly tilted deck assembly is maintained in that state for servicing by terrain engaging elements on that portion of the deck proximate the drive unit when the deck is in mowing position which are moved outboard of a vertical plane containing the pivotal connection of the arms to the deck in the upwardly tilted position. The terrain engaging elements cooperate with the deck support pivots to form a gravitational moment tending to rotate the deck further toward a fully inverted position thereby providing an over center means of retaining the tilted position of the deck assembly. In order to facilitate this tilting motion, the pivotal connection between the drive unit and arms, the length of the arms, and the structure of the deck assembly and the drive unit affords sufficient freedom of lifting motion of the deck assembly to clear the terrain beneath the deck with the terrain engaging elements when the deck general plane is perpendicular to the terrain.

A rotary drive for the mower blade or blades beneath the deck is continuously engaged for the mowing position, the raised position, and the tilted position of the deck assembly. A drive shaft on the drive unit is arranged for rotation about an axis coaxial with the pivot axis of the deck assembly support linkage pivotal connection to the drive unit. A drive shaft on the deck is arranged for rotation about an axis coaxial with the pivot axis of the pivotal connection between the deck and the support linkage. A flexible closed loop drive linkage such as a chain with sprockets on the two drive shafts or a V-belt and pulleys on those shafts drivingly couples the blade or blades for rotation as through a gear box on the deck assembly having an output shaft through the deck to which the mower blade is secured.

A deck assembly and mounting arrangement for a front mounted mower deck assembly on a drive unit is arranged so that the deck can be rotated to a position exposing its undersurface, advantageously at least through an arc of ninety degrees. This permits the assembly to be cleaned, and the drive and blades to be inspected and if necessary repaired or replaced while the deck assembly and the drive unit remains assembled and standing on ground.

In a front or rear mounted mower deck assembly according to this invention, the deck assembly is pivotally mounted on support arms pivotally connected to the drive unit chassis with the pivot axes at the chassis and deck assembly parallel to the support surface for the drive unit, the ground, and normal to the fore-and-aft longitudinal axis of the drive unit, the normal driving direction. The deck pivots are located in a plane normal to the ground and near the center of gravity of the deck assembly so that the raised deck can be pivoted around its pivots to an over center position in which it will be maintained by gravity during servicing.

While the drive unit can be clutched to the blade drive with interlock controls to declutch the drive when the deck assembly is raised and/or pivoted to expose the blades upwardly, a convenient safety interlock is utilized which stops the drive motor when the machine operator leaves his seat on the drive unit if the clutch is engaged.

The above and other features and objects of this invention will be appreciated more fully from the following detailed description when read with reference to the accompanying drawings in which.

Figure 1:
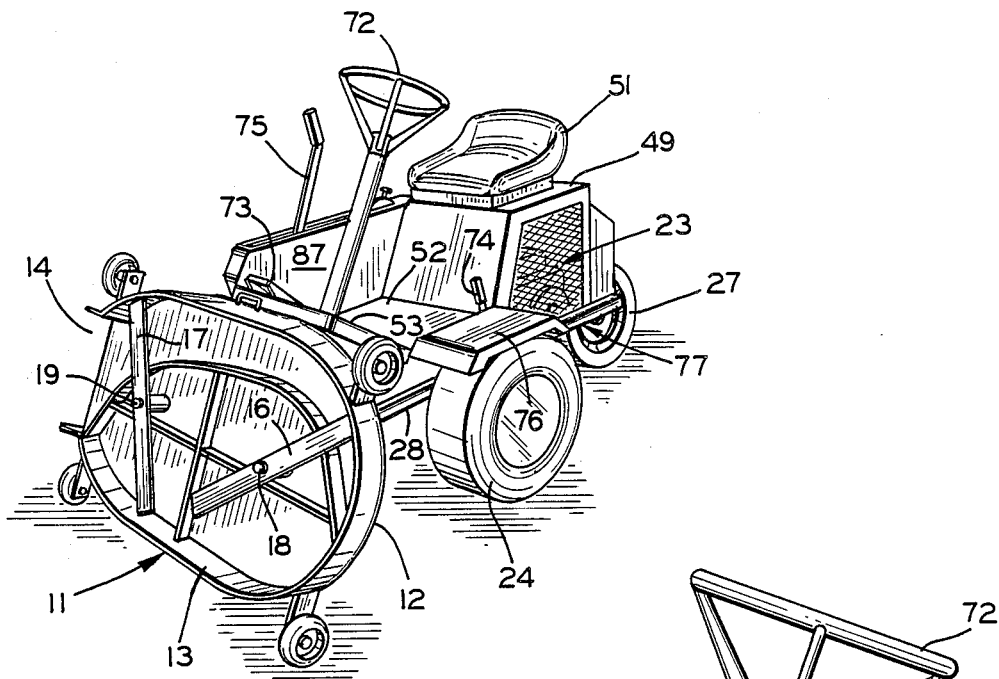
FIG. 1 is a perspective view of a mower having a deck assembly according to this invention raised and inverted to its over center position to expose the deck undersurface for maintenance or servicing.

As shown in FIG. 1, a mower deck assembly 11 comprising a deck 12 having a skirt 13 an a side discharge port 14 for grass clippings supports a pair of rotary mower blades 16 and 17 on spindles 18 and 19 extending from gear boxes 21 and 22 secured to the upper surface of the deck 12. Mower deck assembly 11 is supported on a suitable prime mover or drive unit 23 illustrated as a three wheeled vehicle having paired driving wheels 24 and 26 and a guide wheel 27. Typically, the front mounted rotary mower blades are positioned within skirt 13 and beneath deck 12 to cut overlapping swaths along the fore-and-aft longitudinal axis A-B of the drive unit or tractor 23 with the skirt 13 of generally oval form having its major axis C-D normal to the longitudinal axis A-B of the drive unit.

Mower deck assembly 11 is mounted on the front of the drive unit on arms 28 and 29 respectively pivoted to the drive unit frame 31 at pivot pins 32 and 33 passing through suitable ears 34 and 36 secured to each of the arms and apertured for the pins protruding from frame 31. The pivot axes E-F of pins 32 and 33 are coaxial and are normal to the longitudinal axis A-B of the drive unit and parallel to the general plane of support of the drive unit, the surface of the terrain to be mowed. Arms 28 and 29 are divergent from their pivots 32 and 33 to locations adjacent the upper surface of deck 12. Ears 34 and 36 are bent divergently to accommodate each of the divergent arms 28 and 29 while maintaining the coaxial pivot axes E-F on the drive unit frame. The opposite ends of arms 28 and 29 have depending lugs 37 and 38 having apertures for deck assembly pivot pins 42 and 43.

Pivots 42 and 43 are bolts which pass through ears 44 and 45 secured to deck struts 46 and 47 on the upper surface of deck 12. The pivots are coaxial along the line G-H which is normal to the longitudinal axis A-B of the drive unit and parallel to the general plane of support of the drive unit. Thus, pivot axes E-F and G-H are parallel. Axes G-H is in the same vertical plane as deck oval axis C-D when the deck is in its mowing position. Deck 12 can be pivoted through an arc of about 130° around pivots 42 and 43 which is limited by the length of arms 28 and 29, by the structure of the drive unit, by the drive for the mower blades, and by the deck assembly lifting mechanism.

Drive unit 23 is carried on frame 31 and comprises as major elements a motor housing 49, an operator's seat 51, floorboards 52, a foot rest 53, steering assembly 54, drive clutch 55, mower clutch 56 and deck lift system 57. Frame 31 has cross members 58 and 59. Cross members 58 and 59 support floorboards 52, and brackets 61 and 62 and journals 63 and 64 for mower blade drive shaft 65 to which are keyed V-belt pulleys 66 and 67. Cross member 59 supports floorboards 52 and drive clutch 55 (by means not shown). A central stringer 68 is secured to cross members 58 and 59 and mounts a steering clevis 69 for a steering sprocket in the roller chain steering system (not shown) for control of the rear guide wheel 27. A steering column 70 extends from floorboard 52 at its intersection with foot rest section 53 and contains a steering shaft arranged for rotation within column 70 under control of steering wheel 72. Motor housing 49 supports an operator's seat 51 convenient to the steering wheel 72, to a foot pedal control 73 for forward, neutral and backing control of drive clutch 55 (through a suitable linkage not shown), to a lever clutch control 74 for mower clutch 56, and to the actuating lever 75 of deck lift system 57.

Figure 2:
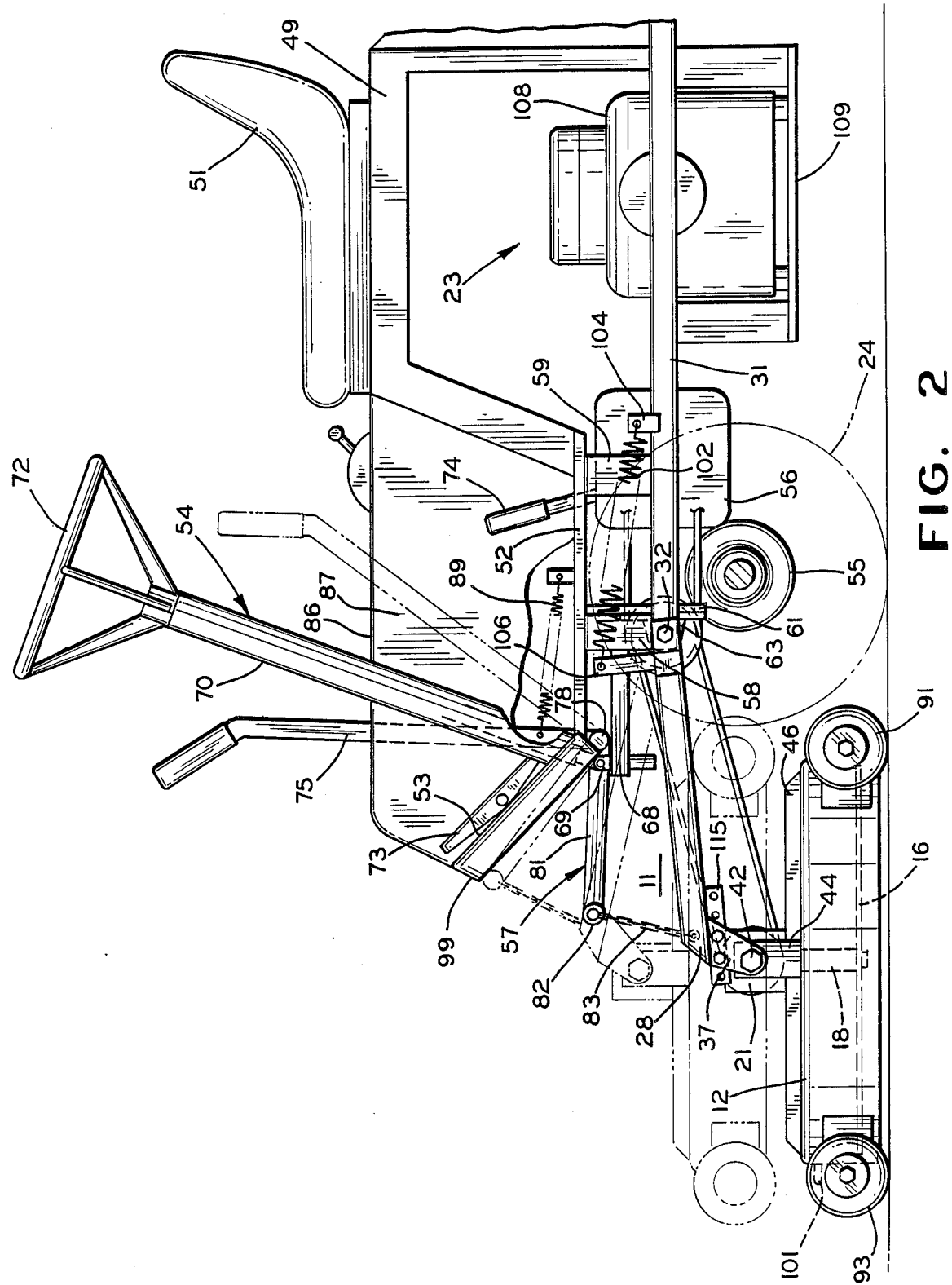
FIG. 2 is a side elevational view of the deck assembly of this invention and fragmentary portions of the front of the drive unit of FIG. 1 supporting the assembly in its mowing position with a phantomed representation of the deck assembly raised for non-mowing transport.
Figure 4:
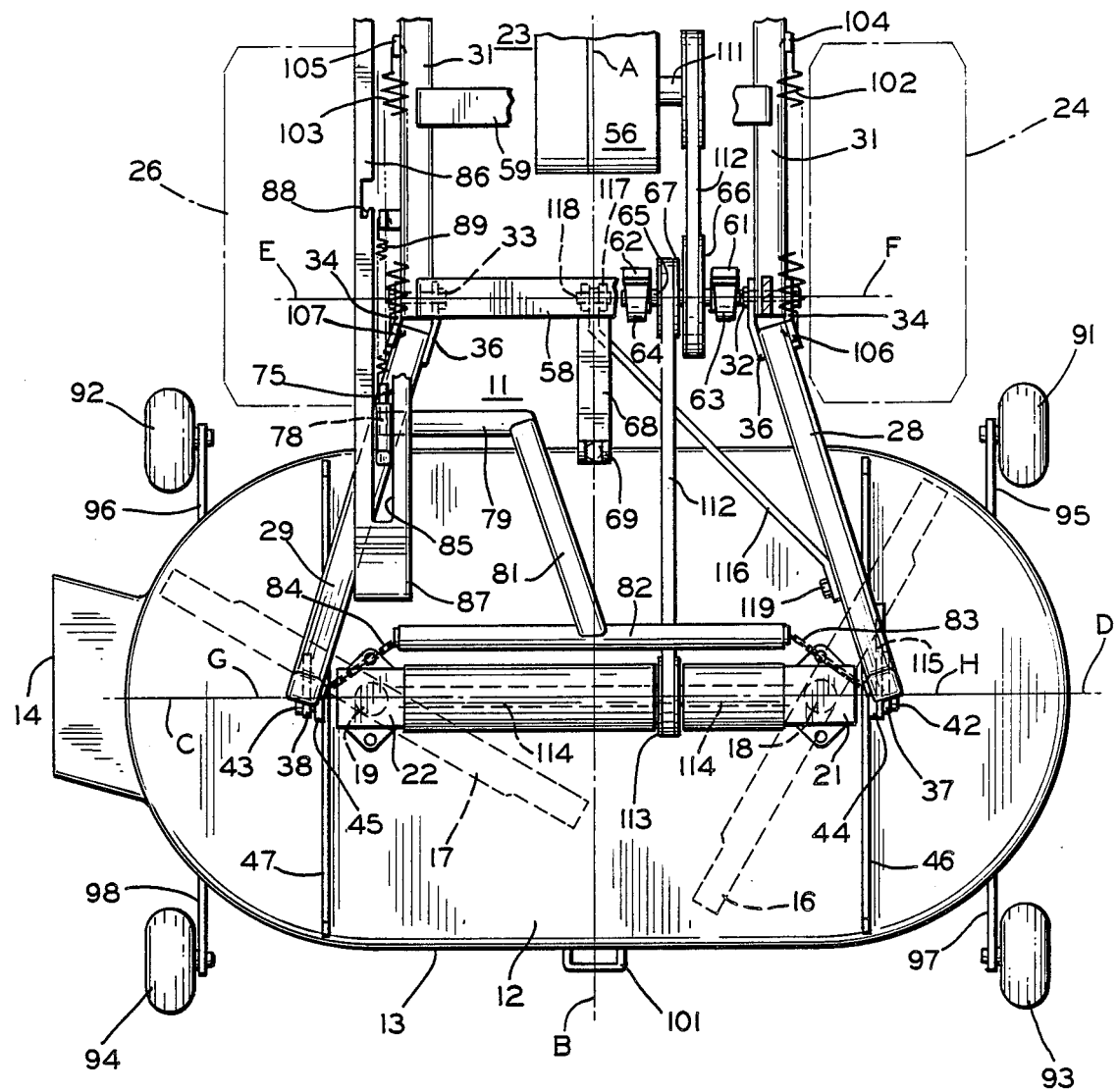
FIG. 4 is a plan view of fragments of the drive unit and of the deck assembly and its support and blade drive coupling to the mower drive unit of FIGS. 1 and 2.
Figure 5:
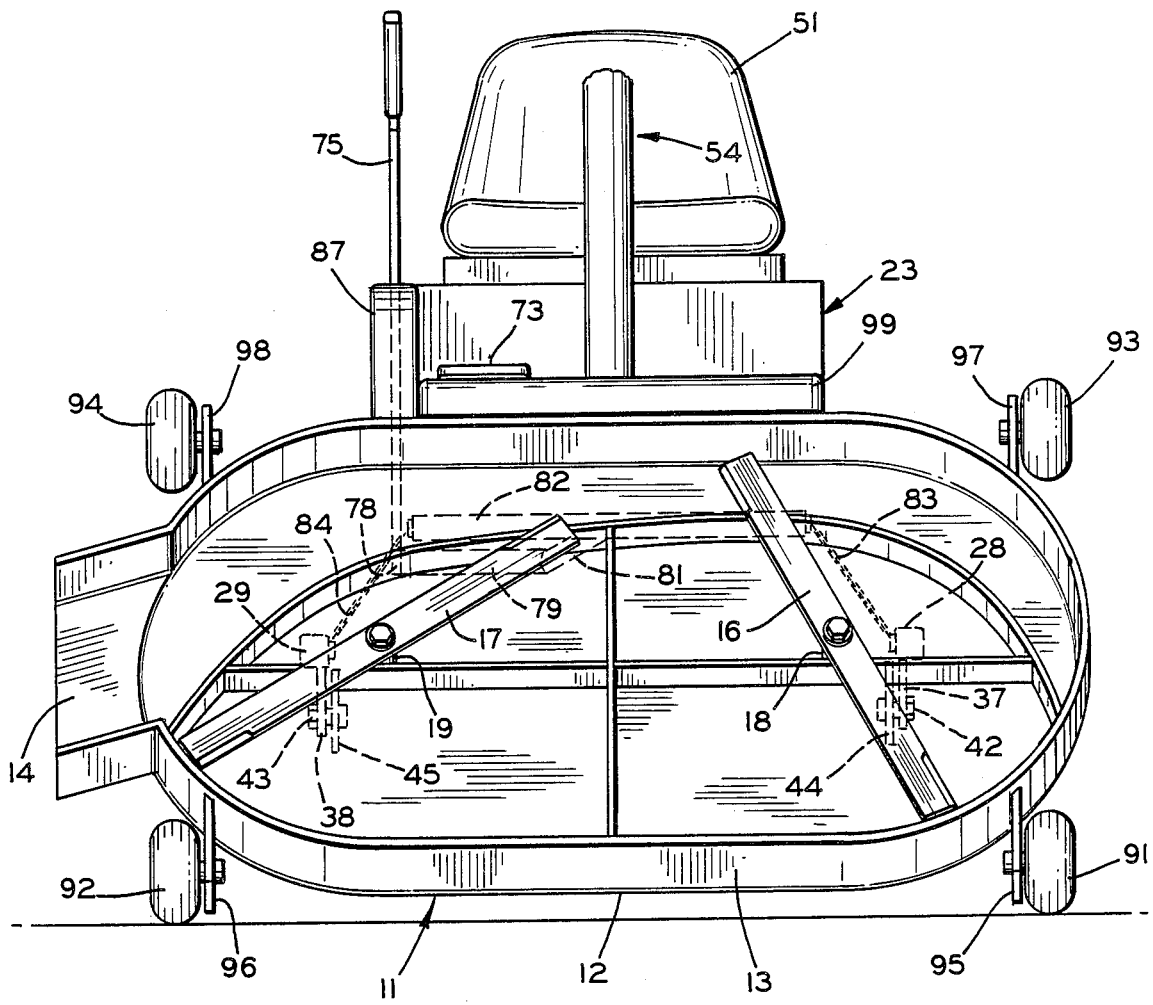
FIG. 5 is a front elevational view of the deck assembly and fragmentary portions of the front of the drive unit of FIG. 1 supporting the assembly in its servicing position as shown in FIG. 3.

Deck lift system or elevator 57 is a bell crank pivoted on drive unit 23 at 78 with an offset shaft 79 longitudinally coaxial with the pivot axis of pivot 78 to locate the lifting lever 81 of the bell crank near the centerline of drive unit 23. A T-bar 82 on the free end of lever 81 extends transversely and parallel with the horizontal axis of pivot 78. Flexible lifting linkages 83 and 84, which may be chains, extend from the ends of T-bar 82 to deck mount arms 28 and 29. The deck 12 is lowered to its mowing position by permitting the actuating lever 75 to assume a forward position as shown in FIG. 2. The range of motion of actuating lever 75 is established by a slot 85 in flange 86 on the side panel 87 of drive unit 23 as best shown in FIG. 4. A latch in the form of a tooth 88 on the margin of slot 85 maintains the retracted actuating lever 75 at a level to lift the deck mount arms 28 and 29 and the deck to a position in which the deck clears the terrain for transport. Actuating lever 75 is biased toward the retracted position by a spring 89 to maintain chains 83 and 84 taut when the deck 12 is in its mowing position.

Deck assembly 11 including the deck 12, blades 16 and 17, and gear boxes 21 and 22 and their drive train are supported on the terrain to be mowed by gauge wheels 91, 92, 93 and 94. The gauge wheels are arrayed to engage the terrain and support the deck assembly 11 in stable equilibrium and thus could be in a triangular array generally encompassing the oval deck perimeter. In the exemplary embodiment, a rectangular array is employed with gauge wheels at the corners. Brackets 95, 96, 97 and 98 are secured as by welding to the deck skirt 13 to support the axles of the gauge wheels. Bolts threaded into tapped holes in the brackets provide suitable axle supports and can be locked with lock nuts. Adjustment of cutting height is provided by an array of tapped holes in brackets 95, 96, 97 and 98 at various heights relative to the deck assembly 11.

Rear gauge wheels 91 and 92 are located on the deck assembly 11 so that their ground engaging circumferences are below the lower lip of skirt 13 when the deck assembly 11 is in its mowing position and are outside of a plane normal to the general plane of the deck and parallel to the pivot axes E–F and G–H at the limits of the skirt most proximate the prime mover. The weight of those portions of the deck assembly 11 supported at pivots 42 and 43 is generally equally distributed on each side of pivot axis G–H and is primarily below tat axis so that when the deck assembly 11 is pendant from pivots 42 and 43, it assumes a generally horizontal position.

When raised from the mowing position, the pendant deck assembly 11 can be rotated about its pivots 42 and 43. The generally planar upper surface of the deck is clear of protrusions ahead of the region along the pivot axis G–H so that the portion ahead of the elements along G–H as viewed in the illustrative embodiment can be turned through ninety degrees and beyond until it meets an element on the prime mover 23 such as the end flange 99 on foot rest 53 or the T-bar 82 on the lifting system 57. In such rotated position the underside of deck assembly 11 is readily accessible for servicing such as cleaning and blade removal without elevating or tipping the prime mover or removing the assembly from the prime mover.

Figure 3:
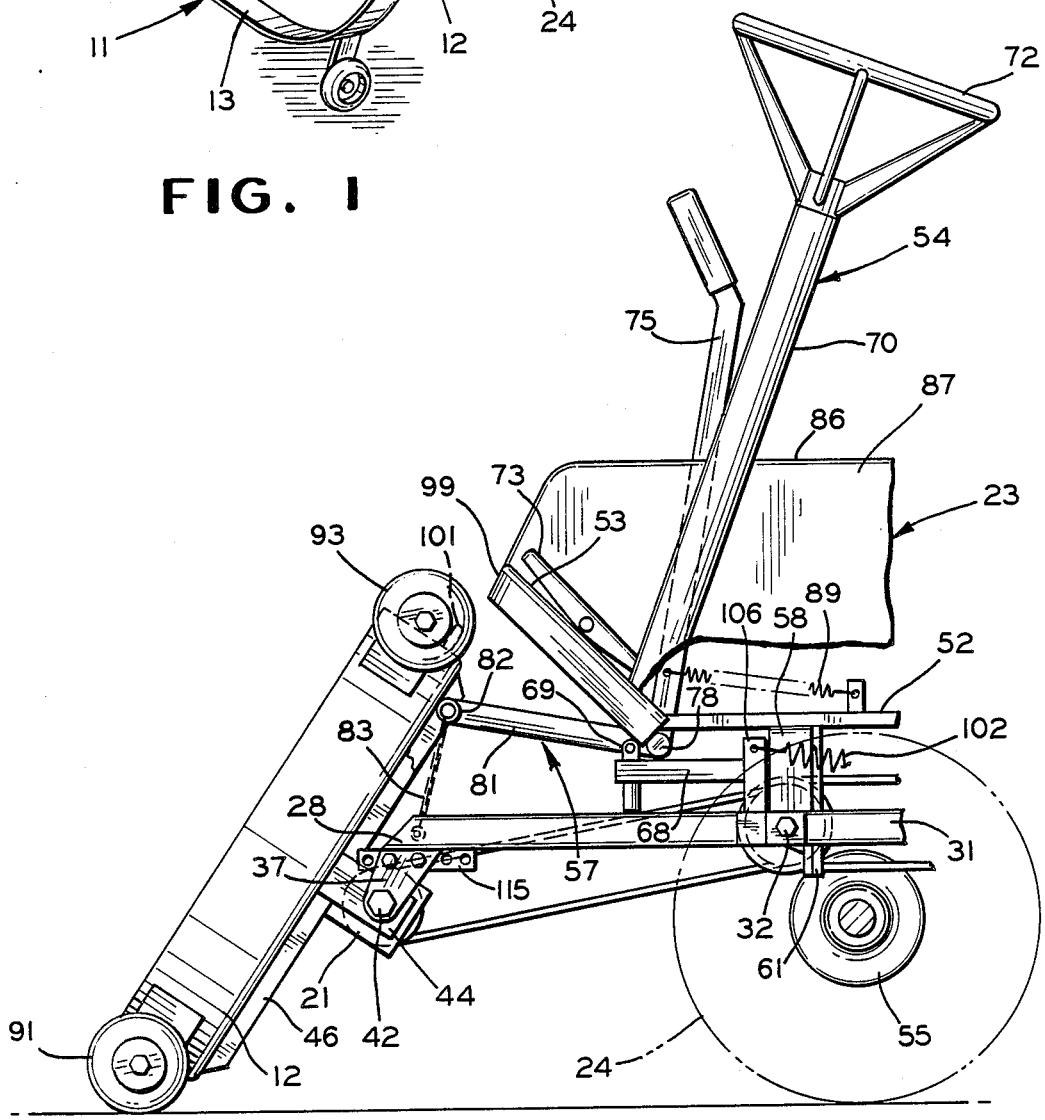
FIG. 3 is a side elevational view as in FIG. 2 showing the deck raised and rotated to its over center position.

The deck assembly when tipped to or beyond a quadrature relationship from the mowing position can be retained in that tipped position by gravity. A gravity induced moment is imposed about pivot 42 and axis G–H by the weight of the deck assembly when the assembly is supported by the terrain at gauge wheels 91 and 92 when the axis G–H is over center with respect to the line between the point of tangency of wheels 91 and 92 with the terrain, thereby producing a clockwise moment around pivot axis G–H as viewed in FIG. 3. Tilting of the deck assembly to this position is facilitated by a handle 101 secured to the forward portion of the skirt 13 in cooperation with the placement of the latch or tooth 88 for lift actuating lever at a location along slot 85 permitting the gauge wheels most proximate the prime mover to engage the terrain while the deck is lifted and latched at 88.

Only moderate force is necessary to develop an adequate gravitational moment to retain the deck assembly in its tilted service position. Accordingly, a portion of the deck assembly weight is counterbalanced by means of tension springs 102 and 103 secured to the drive unit frame 31 at 104 and 105 and to lever arms 106 and 107 fixed on mount arms 28 and 29 to tend to raise those arms.

Drive motor 108 mounted on pan 109 between the longitudinal stringer tubes of frame 31 has a horizontal output shaft transverse of the longitudinal or fore-and-aft axis A–B of the drive unit 23. V-belt drives can be employed from motor 108 to an input shaft for drive clutch transmission 55 and an input shaft for mower clutch 56. Drive clutch transmission is controlled by a rocking foot pedal 73 to shift between neutral and a forward or reverse drive. Mower clutch 56 is controlled by lever 74 between a neutral and engaged position by fore-and-aft motion of the lever 74.

Blade drive is continuously coupled to mower clutch output pulley 111 through V-belt 112 to V-belt pulley 66 on drive shaft 65, thence to V-belt pulley 67 to V-belt 112 to the V-belt pulley 113 keyed to the drive shaft 114 which inputs gear boxes 21 and 22 on the deck assembly 11. A constant distance between drive shaft 65 on the drive unit 23 and drive shaft 114 on the deck assembly 11 is maintained for all positions of elevation and tilt of the deck relative to the drive unit by locating the rotational axis of drive shaft 65 coaxial with the drive unit-to-mount arm pivotal connection pivot axis E–F and locating the rotational axis of drive shaft 114 coaxial with the mount arm to deck assembly pivotal connection pivot axis G–H. This relationship establishes a constant loop length for V-belt 112 which ideally requires no adjustment. However, limited belt stretch is accommodated by an adjustment of the position of lug 37 for pivot 42 along the length of mount arm 28 by means of bolts through the base of the bracket 115 on arm 28.

During a turn of the mower, side thrust is imposed on the deck by the engagement of gauge wheels 91, 92, 93, and 94 with the terrain. A diagonal stabilizer arm 116 supports the deck assembly against such side thrust. Arm 116 is pivoted on bracket 117 from drive unit cross bar 58 with its pivot axis at 118 coaxial with the axis E–F and is bolted or otherwise removably connected to mount arm 28 near the outer end of the arm at 119. When drive belt 112 is to be replaced, diagonal arm 116 is disconnected from mount arm 28.

While the preceding detailed description and the drawings illustrate the invention as applied to a front mounted mower deck assembly, it is to be understood that many aspects of the invention can be applied to mower deck assemblies mounted outboard of the drive unit. The deck might be behind the drive unit and on the fore-and-aft axis of the drive unit employing means to raise the deck while mounted on the drive unit, a suspension system permitting inversion of the raised deck for servicing, a means to maintain the deck inverted whereby gravity and an over center positioning of the tilted deck is the tilt retaining mechanism, and a drive for mower rotation is continuously engaged for all positions of lift and tilt of the deck assembly. Further, the horizontal, generally planar deck could be on one or both sides of the drive unit and could be suspended on a mounting linkage maintaining it outboard of the drive unit and cooperating with a means to raise the deck and parallel horizontal pivotal connections at the drive unit and at the deck assembly for permitting the lifting and tilting of the deck. In each of these embodiments, the deck is raised while mounted on the drive unit whereby a radius from the deck pivot axis perpendicular to the drive unit supporting terrain is at least the distance between the deck pivot axis and a plane normal to the major body portion of the deck, parallel to the deck pivot axis and passing through the portion of the deck assembly most proximate the drive unit when it is parallel to the terrain supporting the drive unit. The suspension of the deck assembly on the interior portion of the deck, advantageously that portion near the deck cetter along the dimension perpendicular to the axis of the pivotal connections, enables a ground engaging support outboard of a vertical plane through the pivot axis between the deck and mounting linkage to function to retain the deck assembly tilted for servicing from above in such outboard mounting arrangements. Accordingly, it is to be understood that the invention disclosed has been presented in an illustrative form and that the disclosure should not be read in a limiting sense.

What is claimed is:

1. A mower deck assembly for mounting on a drive unit outboard of the drive unit having a fore-and-aft axis along which it is adapted to be advanced comprising:
    a deck having a generally planar major body portion adapted to be generally parallel to the terrain to be mowed when in the mowing position;
    a rotary mower blade mounted for rotation in planes parallel to the major body portion of said deck on the mowing side of the deck most proximate the terrain when in the mowing position;
    a linkage for supporting the deck from the drive unit outboard of the drive unit;
    a first pivotal connection between said linkage and the drive unit having a first pivot axi parallel to the terrain to be mowed;
    a second pivotal connection between said linkage and said deck having a second pivot axis parallel to said first pivot axis;
    means to raise said deck and said linkage while mounted on the drive unit whereby a radius from said second pivot axis perpendicular to the drive unit supporting terrain is at least the distance between said second pivot axis and a plane normal to the major body portion of said deck, parallel to sid second pivot axis, and passing through the portion of said deck assembly most proximate said drive unit when said deck is parallel to the terrain in supporting said drive unit;
    means to rotate said deck, while mounted on said drive unit and raised, around said pivot axes through an arc to position said major body portion of said deck at or beyond a perpendicular to the terrain to a servicing position to expose said blade and the major body portion of said deck on the mowing side for servicing from above; and
    means to maintain said deck in the servicing position.

2. A mower deck assembly according to claim 1 wherein said deck is mounted at the front of the drive unit and said first pivotal connection has its first pivot axis perpendicular to the fore-and-aft axis of the drive unit.

3. A mower deck assembly according to claim 1 wherein said linkage is a pair of arms spaced apart in the direction parallel to the first pivot axis.

4. A mower deck assembly according to claim 1 including means to counterbalance a portion of the weight of aaid deck, said blade and said linkage.

5. A mower deck assembly according to claim 4 wherein said counterbalance means is a tension spring between said linkage and the drive unit.

6. A mower deck assembly according to claim 3 wherein said means to raise said deck is a bell crank pivoted on the drive unit and having on one of its arms a cross bar extending in the direction parallel to the first pivot axis; and
    flexible links from said cross bar to each of said spaced linkage arms.

7. A mower deck assembly according to claim 1 including:
    a first mower blade drive shaft mounted on the drive unit for rotation coaxial with said first pivot axis;
    a second mower blade drive shaft mounted on said deck for rotation coaxial with said second pivot axis;
    a flexible continuous loop drive coupling said first and second shafts for rotation; and
    means imparting rotation of said second shaft to said blade.

8. A mower deck assembly according to claim 3 wherein said deck is mounted at the front of the drive unit, and said first pivotal connection has its first pivot axis perpendicular to the fore-and-aft axis of the drive unit.

9. A mower deck assembly according to claim 8 including:
    a diagonal arm coupled to one of said linkage arms at one end; and
    a pivotal connection to the drive unit on said diagonal arm spaced from one end and having a pivot axis coaxial with said first pivot axis.

10. A mower deck assembly according to claim 5 including:
    gauge wheels on said deck spaced in a pattern of stable equilibrium to gauge the separation of said blade from the terrain to be mowed.

11. A mower deck assembly according to claim 10 wherein said gauge wheels include a pair of wheels extending beyond the major body portion of said deck in the region of said deck most proximate the drive unit when in the mowing position.

12. A mower deck assembly according to claim 11 wherein said second pivotal connection is located on the major body portion of said deck spaced from the region of said deck most proximate the drive unit when in the mowing position.

13. A mower deck assembly according to claim 12 wherein said second pivotal connection is near the center of said deck in the direction normal to the axis of said pivotal connection.

14. A mower deck assembly according to claim 1 wherein said means to maintain said deck in the servicing position comprises:
    means on said deck to engage the terrain outboard from the drive unit and said second pivotal connection pivot axis to impose a moment on said deck assembly around said second pivot axis due to over center gravitational forces.

15. A mower comprising:
    a drive unit;
    a mower deck supported outboard from said drive unit;
    a link between said drive unit and said deck;
    pivotal connections having pivot axes parallel to each other and parallel to the supporting terrain surface for said drive unit between said link and said drive unit and between said link and said deck;
    a mower blade rotatably mounted on said deck;
    a terrain engaging support for said mower deck secured to said deck between said pivotal connections to said deck and said drive unit while the general plane of said deck is parallel to the supporting terrain surface for said drive unit;
    said deck being arranged with respect to said drive unit for rotation about said pivotal connection to said deck from the position in which the general plane of said deck is parallel to the supporting terrain surface for said drive unit to a position in which said support for said deck engages the supporting terrain surface for said drive unit outboard of a vertical plane through said pivotal connection to said deck to expose said mower blade and underside of said deck for servicing from above from a position outboard of said drive unit and deck.

16. A mower comprising:
a drive unit;
a mower deck supported ahead of said drive unit;
a link between said drive unit and said deck;
pivotal connections having pivot axes perpendicular to a plane defined by the axis along which the mower is advanced and perpendicular to the mower supporting terrain between said link and said drive unit and between said link and said deck;
said pivotal connection to said deck being located on said deck to suspend the general plane of said deck generally parallel to the terrain;
a mower blade mounted for rotation generally parallel to said deck on the underside of said deck;
said link and said pivotal connections permitting the transfer of said deck between a mowing position adjacent the terrain and a position raised from said terrain;
lift mechanism to transfer said deck between a mowing position adjacent the terrain and a position raised from said terrain while secured to said drive unit;
said deck and said drive unit having clearance with respect to each other when said deck is raised to permit the rotation of said deck through an arc around said pivotal connection to said deck sufficient to expose said mower blade and underside of said deck for servicing from a position above and in front of said drive unit and deck.

17. A mower according to claim 16 wherein said deck pivotal connection is located above the center of gravity of said deck whereby the general plane of said deck when suspended from said pivotal connection is generally horizontal.

18. A mower according to claim 17 including a terrain engaging support for said deck secured to said deck and having a supporting surface for engagement with the terrain between vertical planes normal to the axis along which the mower is advanced and containing the pivot axis of said pivotal connections to said deck and to said drive unit when the general plane of said deck is generally horizontal;
said support engaging said terrain outboard and forward of the vertical planes normal to the axis along which the mower is advanced and containing the pivot axes of the pivotal connections to said deck and to said drive unit when said deck is rotated about the pivot axis of said pivotal connection to said deck to maintain said deck in a position to expose said mower blade and the underside of said deck for servicing from a position in front of said drive unit and deck.

19. A mower according to claim 18 wherein said support for said deck is a pair of gauge wheels for spacing said deck and blade from said terrain.

20. A mower according to claim 18 wherein the spacing of said support engaging said terrain from said deck is adjustable.

21. A mower according to claim 16 wherein said link is a pair of arms spaced across the width of said drive unit and said deck.

22. A mower according to claim 21 including a brace arm extending from one of said arms to a pivotal connection on said drive unit having a pivot axis coaxial with the pivot axis of said pivotal connection for said link to said drive unit to absorb side thrust on said deck.

23. A mower according to claim 16 including a lever for said lift mechanism and a latch for said lever when positioned to raise said deck from the terrain.

24. A mower according to claim 23 including a flexible coupling between said lift mechanism and said deck, and means to tension said flexible coupling when said deck is lowered to its mowing position.

25. A mower according to claim 16 including a drive for rotating said mower blade, said drive being mounted on said deck and having an input shaft having an axis of rotation coaxial with the pivot axis of the pivotal connection of said to said deck;
a rotating output shaft on said drive unit having an axis of rotation coaxial with the pivot axis of the pivotal connection of to said drive unit; and
an endless loop drive coupling between said output shaft and said input shaft of said blade drive.

26. A mower according to claim 25 including a second mower blade mounted for rotation generally parallel to said deck on the underside of said deck in the same cutting plane as said first mentioned mower blade and including a cutting arc overlapping the cutting arc of said first mentioned blade;
a first gear box mounted on said deck for translating said drive input shaft rotation to rotation of said first mentioned blade;
a second gear box mounted on said deck for translating said drive input shaft rotation to rotation of said second blade; and
means maintaining the rotation of said blades out of phase and in a non-interfering relationship.

* * * * *